United States Patent [19]

Nakamura

[11] Patent Number: 4,745,949

[45] Date of Patent: May 24, 1988

[54] MECHANICALLY TIMED MIXING FAUCET FOR AIRCRAFT LAVATORIES AND THE LIKE

[76] Inventor: Ichiro Nakamura, 5900 119th Ave., SE., Bellevue, Wash. 98006

[21] Appl. No.: 53,059

[22] Filed: May 22, 1987

[51] Int. Cl.⁴ .............................................. F16K 31/00
[52] U.S. Cl. ................................ 137/624.12; 74/405; 74/411.5
[58] Field of Search ...................... 137/624.11, 624.12, 137/624.22; 74/1.5, 2, 405, 411.5

[56] References Cited

U.S. PATENT DOCUMENTS

| | | | |
|---|---|---|---|
| 1,445,871 | 2/1923 | Davis | 137/624.22 |
| 1,468,949 | 9/1923 | Koch. | |
| 1,747,117 | 11/1923 | Meyer | 137/624.22 X |
| 2,115,689 | 4/1938 | Morrison | 137/624.22 |
| 2,545,928 | 3/1951 | Martin | 137/624.22 X |
| 2,996,082 | 8/1961 | Miner. | |
| 3,026,907 | 3/1962 | Klingler. | |
| 3,351,095 | 11/1967 | Harvey et al.. | |
| 3,385,324 | 5/1968 | Wolf et al.. | |
| 3,893,481 | 7/1975 | Watts. | |
| 4,040,446 | 8/1977 | Watts. | |
| 4,286,623 | 6/1981 | Spanides. | |

Primary Examiner—Alan Cohan

Attorney, Agent, or Firm—Graybeal, Jensen & Puntigam

[57] ABSTRACT

A faucet assembly comprising a movable handle, an axially adjustable mixing valve operated by the handle, and a timer assembly. The timer assembly is entirely mechanical and comprises a drive gear, an actuator arm coupling the drive gear to the handle, a timer gear journalled coaxially with the drive gear, fixed check gear coaxial with the drive gear, and a latch. The latch is carried transversely on the drive gear, and terminates at either end in first and second latch arms extending opposite to each other substantially parallel to the drive gear. The first latch arm mechanically latches the drive gear to the timer gear when the handle is depressed toward the open position. The second latch arm latches the drive gear to the fixed check gear when the handle reaches the open position. The timer counterrotates the timer gear at a given rate after the timer gear and the drive gear are unlatched. A hook extending outwardly from the timer gear reengages the first latch arm with the timer gear after the timer gear has been counterrotated by the timer. A valve spring in the mixing valve biases the handle and the drive gear coupled thereto toward the closed position, so that when the drive gear is unlatched from the check gear the handle returns to the closed position.

16 Claims, 2 Drawing Sheets

MECHANICALLY TIMED MIXING FAUCET FOR AIRCRAFT LAVATORIES AND THE LIKE

BACKGROUND OF THE INVENTION

1. Technical Field

This invention relates to faucets. More particularly, it relates to a faucet with a timer for shutting off the flow from the faucet after a predetermined interval has elapsed.

2. Description of the Prior Art

Axial mixing valves are well-known in the art, as are faucets with timed shutoffs. Known timed faucets are electrically operated, and thus dependent on an uninterrupted supply of electricity. Some electrically timed faucets include electric pumps connected to an electronic timer circuit. A major disadvantage of these electrically timed, pumped faucets is their inability to discharge water without a supply of electricity. This is an especially important consideration for faucets to be used in aircraft lavatories and the like.

SUMMARY OF THE INVENTION

It is thus an object of the present invention to provide a faucet with a timed shutoff which is not dependent on electric power. It is a further object of this invention to provide a mechanically timed faucet suitable for aircraft lavatories and the like. It is another object of this invention to provide a mechanically timed faucet which mixes liquid from two inlets in selected, variable proportion. It is yet another object of this invention to provide a mechanically timed mixing faucet which can be operated with only one hand. It is yet another object of this invention to provide a mechanically timed mixing faucet which discharges at a substantially constant rate of flow.

These and other objects are provided by a timer assembly for use with a faucet having a handle and valve means operated by the handle. The timer assembly comprises a rotatable drive wheel, coupling means for rotating the drive wheel, a rotatable timer wheel, first latch means between the drive wheel and the timer wheel, a check wheel, second latch means between the drive wheel and the check wheel, timer means for counterrotating the timer wheel, releasing means for releasing the second latch means, and biasing means for biasing the drive wheel. The handle is movable between a closed position and an open position. The valve means draws liquid from an inlet and discharges the liquid from an outlet when the handle is in the open position, while preventing such discharge when the handle is in the closed position. The coupling means rotates the drive wheel when the handle is moved toward the open position. The first latch means mechanically latches the drive wheel to the timer wheel when the handle is moved toward the open position. The check wheel is fixedly mounted relative to the drive wheel. The second latch means mechanically releases the first latch means and latches the drive wheel to the check wheel when the handle is in the open position. The timer means counterrotates the timer wheel at a given rate after the drive wheel is unlatched from the timer wheel. The biasing means biases the drive wheel opposite the direction in which the drive wheel is rotated by the coupling means when the handle is moved toward the open position. The releasing means releases the second latch means after a given degree of counterrotation of the timer wheel. As presently preferred, the drive wheel, the coupling means, the check wheel, the timer wheel, and the timer means comprise toothed gears, and the valve means comprises an axially adjustable mixing valve.

DESCRIPTION OF THE PREFERRED EMBODIMENT

Figure 1:
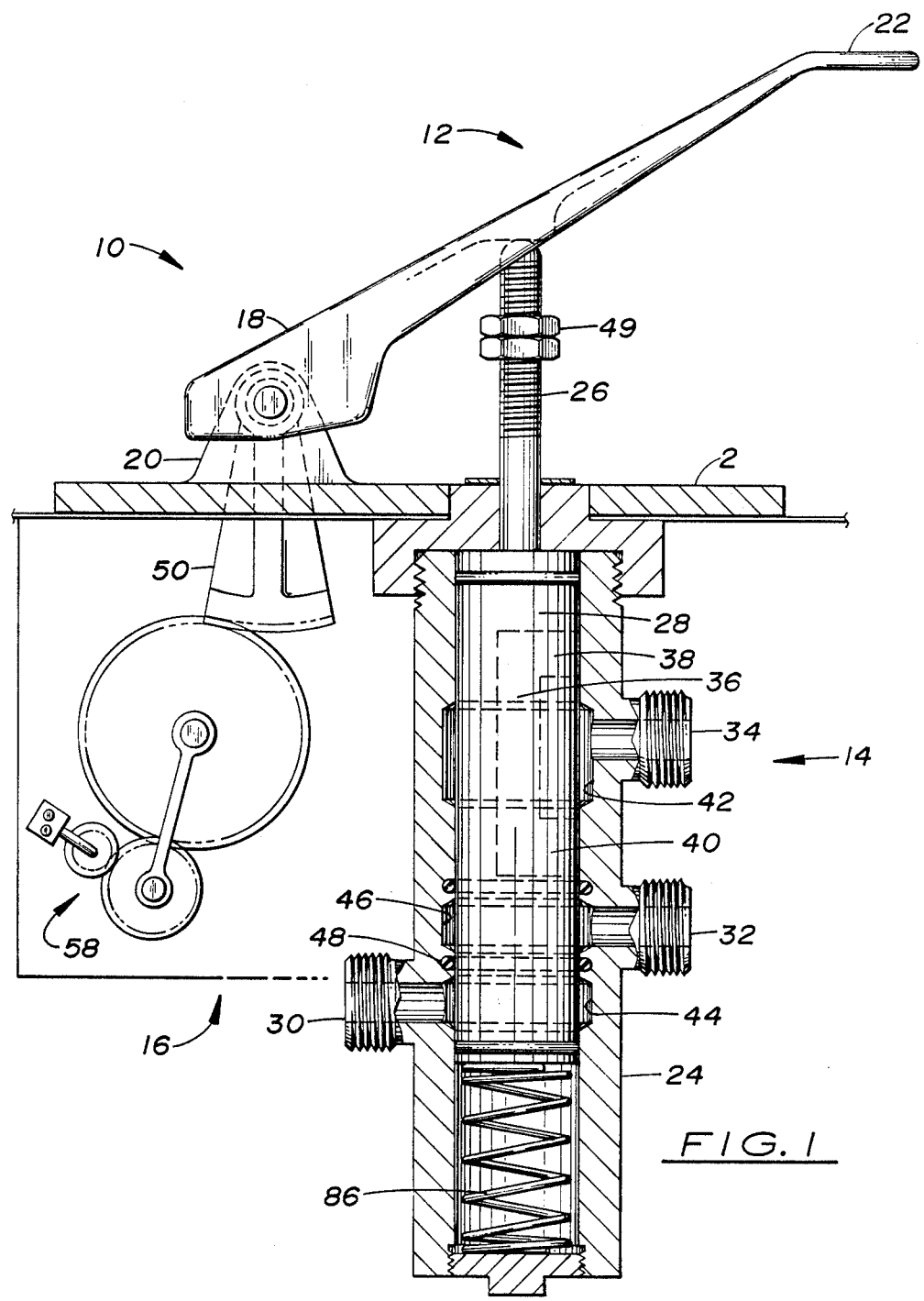
FIG. 1 is a side elevational and partial cross-sectional view of a faucet according to the present invention, showing the handle, the valve means in cross-section along its longitudinal axis, and the timing assembly.

As seen in FIG. 1, a faucet assembly 10 according to the present invention comprises a handle 12, a mixing valve 14, and a timing assembly 16. A proximal end 18 of the handle 12 is mounted on an upper surface of a counter 2 2 pivotally about a horizontal axis of a mounting boss 20. The handle 12 has a manually operable distal end 22 which moves vertically between an upper closed position and a lower open position. The mixing valve 14 is in fluid communication between hot and cold water supplies (not shown) and the spigot (not shown). The valve 14 draws and mixes liquid from one or both of the hot and cold water supplies and discharges them when the handle 12 is in the open position. The valve 14 prevents such liquid discharge when the handle 12 is in the closed position.

The mixing valve 14 comprises a hollow, substantially cylindrical housing 24, a stem 26 extending upwardly from the housing, a substantially cylindrical plunger 28 within the housing and fixedly carrying the stem, axially offset first and second inlets 30, 32 into the housing and an outlet 34 from the housing. The first and second inlets 30, 32 are in fluid communication with the hot and cold water supplies, respectively, and the outlet 34 is in fluid communication with the spigot. The proportion of hot and cold water mixed and discharged from the outlet 34 is determined by the axial position of plunger 28 in the housing 24. When the plunger 28 is in an uppermost position, discharge of water from the spigot is prevented. When the plunger 28 is positioned in a lower position within the housing 24, water from one or both of the inlets 30, 32 is drawn through an interior channel 36 in the plunger, and discharged from said channel through the outlet 34 to the spigot 16.

The inlets 30, 32 are axially offset from each other so that the openings thereof into the interior of the housing 24 are axially separated. The outlet 34 is axially positioned in the housing above both the inlets 30, 32. The axial longitudinal interior channel 36 communicates with the inlets 30, 32 and the outlet 34 through upper and lower radial channels 38, 40 in the body of the plunger. When the plunger 28 is suitably aligned axially within the housing 24, the upper radial channel 38 is aligned with the outlet 34, and the lower radial channel 40 is aligned with one or both of the inlets 30, 32, thereby allowing fluid to flow from the one or two inlets through the lower radial channel, up the axial interim channel 36 and out the upper radial channel to the outlet, and thence to the spigot. When plunger 28 is positioned so that the lower radial channel 40 is aligned only with the first, hot water inlet 30, only hot water is discharged. Similarly, when the lower radial channel 40 is aligned only with the second, cold water inlet 32, only cold water is discharged. When the lower radial channel 40 is between these two positions a mixture of hot and cold water is discharged, the temperature of which is dependent upon the position of the plunger 28 and the lower radial 40 therein within the housing 24. A warmer mixture is obtained by lowering the plunger 28 within the housing 24 so as to axially align most of the lower radial channel 40 with the first hot inlet 30, and only a small portion of the lower radial channel with the second cold inlet 32.

An axially elongated upper cavity 42 in the interior of the housing 24 at the outlet 34 ensures that water flows freely from the upper radial channel 38 to the outlet 34 both when the lower radial channel 40 is aligned with the hot inlet 30, and when it is aligned with the cold inlet 32. The upper cavity 42 is cut into the wall of the interior of the housing 24, and extends around the entire circumference of the housing. The upper cavity 42 is axially elongated proportionally to the distance which the inlet 30, 32 are axially offset from each other. It is contemplated that the function performed by the upper cavity 42 might also be performed by axially elongating the opening of the upper radial channel 38. Because the upper cavity 42 encircles the interior of the housing 24 in axial alignment with the outlet 34, water drawn up the interior channel 36 and through the upper radial channel 38 can flow around the upper cavity 42 to the outlet 34 regardless of the radial orientation of the upper radial channel 38.

The interior of the mixing valve 14 is further shaped so that the lower radial channel 40 need not be radially aligned with the inlets 30, 32. First and second lower cavities 44, 46 encircle the interior of the housing 24 in axial alignment with the first and second inlets 30, 32 respectively. The lower cavities 44, 46 are cut into the wall of the interior of the housing 24, and extend around the entire circumference of the housing. Each of the inlets 30, 32 opens into its respective lower cavity 44, 46 so that liquid from each inlet fills the respective cavity. A flexible O-ring seal 48 encircling the interior of the housing 24 between the lower cavities 44, 46 sealingly engages the exterior of the plunger 28, providing a watertight seal between the lower cavities 44, 46. When the plunger 28 is depressed within the housing 24 so that the lower radial channel 40 is axially aligned with one or both of the lower cavities 44, 46, water can flow thereinto from one or both of the respective inlets 30, 32, and thence to the lower radial channel 40, regardless of the radial orientation of the lower radial channel. The flow from the inlets 30, 32 into the lower radial channel 40, and from the upper radial channel 38 to the outlet 34, can be further facilitated by providing multiple radial channels where the single radial channels 38, 40 are shown.

A temperature adjustment nut 49 is threadably mounted on the stem 26 so as to engage the surface of the counter 2 when the handle 12 and stem 26 are depressed, thereby limiting downward movement of the plunger 28 and thus limiting the maximum temperature of the water to be discharged by the mixing valve 14.

Figure 2:
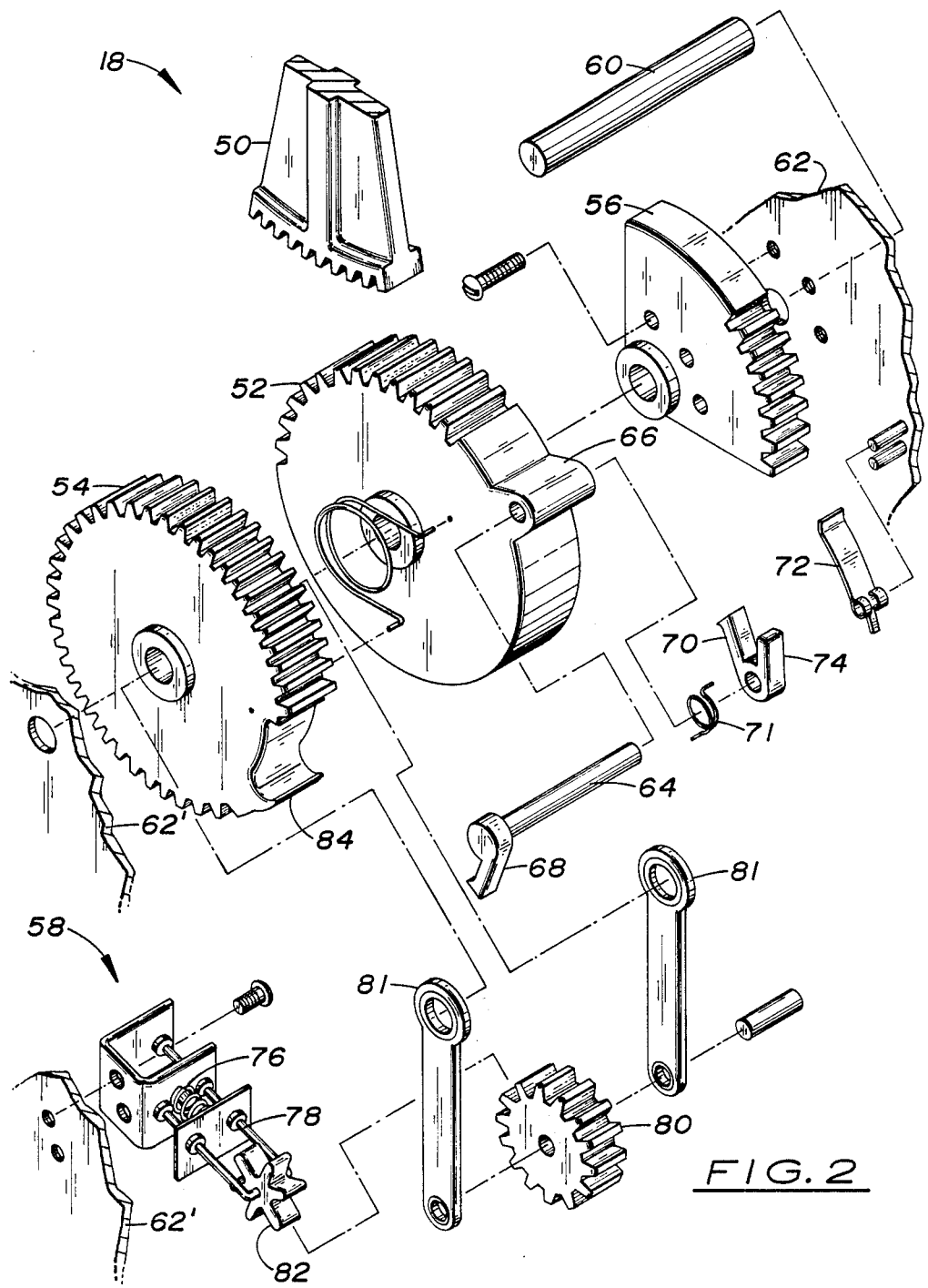
FIG. 2 is an isometric exploded view of the timing assembly of FIG. 1.

The timing assembly 16 provides an entirely mechanical timed shutoff of flow through the faucet assembly 10. The timing assembly 16 is shown in exploded isometric view in FIG. 2. The timing assembly 16 comprises a coupling arm 50, a drive gear 52, a timer gear 54, a check gear 56, and a timer 58. The coupling arm 50 depends rigidly from and substantially perpendicularly to the proximal end 18 of the handle 12. When the distal end 22 of the handle 12 is manually depressed, pivoting the handle, the coupling arm 50 is pivoted as well. The distal end of the coupling arm 50 is shaped in a circular arc centered on the pivot axis of the handle 12. Conventional gear teeth are arranged along the arcuate distal end of the coupling arm 50. The teeth of the coupling arm 50 engage corresponding teeth of the drive gear 52, so that when the coupling arm is pivoted the teeth thereof rotate the drive gear.

The drive gear 52 is positioned coplanar with the coupling arm 50, and is journaled about an axle 60. The axle 60 is supported at each end on opposite walls 62, 62' of a box enclosing the timing assembly 18. The timer gear 54 is also journaled on the axle 60 to one side of the drive gear 52. The check gear 56 is secured to one of the walls 62 on the opposite side of the drive gear from the timer gear 54. A latch 64 carried on the drive gear 52 parallel to the axle 60 latches the drive gear alternately to the timer gear 54 or to the check gear 56. The latch 64 is rotatably mounted through a boss 66 which extends radially outward from the circumference of the drive gear 52. The latch 64 comprises a solid rod terminated at either end by opposed, perpendicularly extending first and second latch arms 68, 70. The distal end of the first latch arm 68 is positioned to engage the teeth of the timer gear 54. The second latch arm 70 extends from the rod of the latch 64 in an opposite direction to the first latch arm 68, with the distal end thereof positioned to engage the teeth of the check gear 56. The latch arms 68, 70 are arranged so that when one of the latch arms engages its respective gear, the other latch arm is disengaged. Thus, the latch 64 alternately latches the drive gear 52 to the timer gear 54 or to the check gear 56 according to the rotational position of the latch 64 about its longitudinal axis. A latch spring 71 biases the latch 64 to engage the first latch arm with the timer gear 54.

When the handle 12 is depressed, pivoting the coupling arm 50 and thereby rotating the drive gear 52, the first latch arm 68 latches the drive gear to the timer gear 54, causing the timer gear to be rotated simultaneously with the drive gear in response to the downward movement of the handle. When the handle is fully depressed in its open position, and the mixing valve 14 is discharging water from the outlet 34, the drive gear 52 is unlatched from the timer gear 54 by disengaging the first latch arm 68 from the timer gear, and the drive gear is instead latched to the check gear 56 by engaging the second latch arm 70 with the fixed check gear 56. With the drive gear thus latched to the check gear, the handle 12 is retained in the open position and the mixing valve 14 continues its discharge.

The second latch arm 70 is pressed into engagement with the check gear 56 by a leaf spring 72. The leaf spring 72 is affixed to the wall 62 closely adjacent the check gear 56, so as to engage a laterally extending lever 74 affixed to the second latch arm 70. The second latch arm 70 and lever 74 form an acute angle of about 40°, with the second latch arm interposed between the lever and the check gear 56. As the drive gear 52 is rotated by the coupling arm 50, the lever 74 of the latch 64 carried on the drive gear approaches and progressively engages the leaf spring 72. As the lever 74 engages the leaf spring 72, the lever and the second latch arm 70 are together forced toward the check gear 56, until finally the second latch arm 70 engages the gear teeth of the check gear. As the second latch arm 70 is forced toward the check gear, the resulting axial rotation of the latch 64 lifts and disengages the first latch arm 68 from the timer gear 54. The timer gear 54 is thus unlatched from the drive gear 52 and latched instead to the check gear 56 when the handle 12 reaches the open position.

Once the timer gear 54 has been unlatched from the drive gear 52, it is counterrotated by the timer 58 as a predetermined, measured rate. The timer 58 includes a timer spring 76 having one end fixedly supported on the wall 62' of the box enclosing the timing assembly 18. An opposite end of the timer spring 76 engages a timer shaft 78. The timer shaft 78 is coupled to the timer gear so that when the timer gear is rotated by the drive gear 52, the timer shaft 78 is moved axially, compressing the timer spring 76. The timer 58 thus biases the timer gear toward counterrotation, i.e. in a direction opposite the rotation imparted to the timer gear by the drive gear 52 when the handle 12 is depressed toward the open position. The timer shaft 78 is coupled to the timer gear 54 by a first timer coupling gear 80 fixedly carried on the periphery of the timer gear 54 by fixed timer coupling arms 81, and a second timer coupling gear 82 carried on the timer shaft 78. The use of the timer coupling gears 80, 82 prevents the development of undesirable stresses in the timer shaft 78 without requiring gimballed mounting of the timer spring 76 and timer shaft on the wall 62'.

The timer 58 counterrotates the timer gear 54 after the drive gear 52 has been unlatched from the timer gear and latched instead to the fixed check gear 56. The timer gear 54 includes an outwardly extending hook 84 which forces the first latch arm 68 into reengagement with the timer gear when the timer gear has been counterrotated to its original position by the timer 58. The distal end of the hook 84 is spaced outwardly from the periphery of the timer gear 54 so as to engage the first latch arm 68 when the first latch arm is disengaged and raised away from the timer gear. The hook 84 is radially positioned on the timer gear 54 so as to trap the distal end of the first latch arm 68 between the distal end of the hook and the periphery of the timer gear when the timer gear has been completely counterrotated by the timer 58. Further counterrotation of the timer gear 54 by the timer 58 causes the hook 84 to force the first latch arm 68 into reengagement with the timer gear 54, thereby lifting and disengaging the second latch arm 70 from the check gear 56. When the timer gear 54 has been completely counterrotated by the timer 58, the second latch arm 70 is completely disengaged from the check gear 56 and the drive gear is thereby freed.

When the drive gear 52 is thus freed, the handle 12 is returned to its closed position by a heavy duty valve spring 86 located within the lower end of the housing 24 and compressed between the lower end of the housing and the plunger 28. The valve spring 86 biases the plunger upwardly, causing the stem 26 to lift the handle 12 upward toward the closed position when the drive gear 52 is freed. The valve spring 86 thus biases the drive gear 52 via the plunger 28, the stem 26, the handle 12 and the coupling arm 50.

It will be appreciated that various modifications of the embodiment described above are possible without departing from the scope of the invention. In particular, the drive gear, timer gear and check gear, could be respectively replaced with a drive wheel, a timer wheel, and a check wheel suitably rotatably coupleable to each other. The mechanical timing assembly 18 can be readily adapted to other axial mixing valves which control the flow from a spigot by axial displacement of a valve body, including mixing valves which adjust the temperature of the water discharged from the spigot by means of a horizontally pivotable handle. Accordingly, the scope of the invention is not limited except as by the following claims.

I claim:

1. A faucet assembly for use in aircraft lavatories and the like, comprising:
   a handle movable between a closed position and an open position;
   valve means for drawing liquid from at least one of first and second inlets and mixing and discharging the liquids from an outlet when the handle is in the open position, and preventing such discharge when the handle is in the closed position;
   a rotatable drive wheel;
   coupling means for rotating the drive wheel when the handle is moved between the closed position and the open position;
   a rotatable timer wheel;
   first latch means for mechanically latching the drive wheel to the timer wheel when the handle is moved toward the open position;
   a check wheel fixedly mounted relative to the drive wheel;
   second latch means for mechanically releasing the first latch means and latching the drive wheel to the check wheel when the handle is in the open position;
   timer means for counterrotating the timer wheel at a given rate after the drive wheel is unlatched from the timer wheel;
   releasing means for releasing the second latch means after a given degree of counterreaction of the timer wheel; and
   biasing means for biasing the handle toward the closed position.

2. A faucet assembly according to claim 1, wherein the drive wheel is toothed, and wherein the coupling means comprises an actuator affixed to the handle and having an arcuate, toothed distal end gearably engaging the drive wheel.

3. A faucet assembly according to claim 2, wherein the first latch means and the second latch means together comprise a latch rotatably mounted on the drive wheel, the latch having a first latch arm extending perpendicularly of the latch for engaging the timer wheel and thereby latching the drive wheel to the timer wheel, and a second latch arm extending perpendicularly of the latch opposite to the first latch arm for engaging the check wheel and thereby latching the drive wheel to the check wheel, engagement of the first latch arm with the timer wheel and engagement of the second latch arm with the check wheel being mutually exclusive.

4. A faucet assembly according to claim 3, wherein the latch is journalled through a boss on the periphery of the drive wheel.

5. A faucet assembly according to claim 3, wherein the releasing means comprises outwardly extending hook means affixed to the periphery of the timer wheel, the hook means engaging the first latch arm and latching said arm to the timer wheel when the timer wheel is fully counterrotated.

6. A faucet assembly according to claim 1, wherein the biasing means comprises a coil spring disposed within the valve means.

7. A faucet assembly according to claim 1, wherein the valve means comprises an axially adjustable mixing valve.

8. A faucet assembly according to claim 7, wherein the handle is pivotably mounted, and wherein the valve means engages a portion of the handle outboard of the pivot axis, so that movement of a distal end of the handle causes the valve means to discharge liquid from the outlet.

9. A faucet assembly according to claim 8, wherein the proportion of liquids drawn from the inlets is proportional to the axial position of a stem of the valve means.

10. A faucet assembly according to claim 9, wherein the valve means includes a temperature control nut threadably mounted on the stem for limiting the axial travel of the stem so that a selected fixed proportion of liquids is mixed and discharged.

11. A faucet assembly according to claim 1, wherein the first and second inlets are respectively connected to supplies of hot and cold water.

12. A timer assembly for use with a faucet having a movable handle, and valve means for drawing liquid from an inlet and discharging the liquid from an outlet when the handle is in an open position and for preventing such discharge when the handle is in a closed position, said timer assembly comprising:
 a rotatable drive wheel;
 coupling means for rotating the drive wheel when the handle is moved toward the open position;
 a rotatable timer wheel;
 first latch means for mechanically latching the drive wheel to the timer wheel when the handle is moved toward the open position;
 a check wheel fixedly mounted relative to the drive wheel;
 second latch means for mechanically releasing the first latch means and latching the drive wheel to the check wheel when the handle is in the open position;
 timer means for counterrotating the timer wheel at a given rate after the drive wheel is unlatched from the timer wheel;
 releasing means for releasing the second latch means after a given degree of counterrotation of the timer wheel; and
 biasing means for biasing the drive wheel opposite the direction in which the drive wheel is rotated by the coupling means when the handle is moved toward the open position.

13. A timer assembly according to claim 12, wherein the drive wheel is a toothed gear and wherein the coupling means comprises an actuator affixable to the handle and having an arcuate, toothed distal end gearably engaging the drive wheel.

14. A timer assembly according to claim 12, wherein the first latch means and the second latch means together comprise a latch rotatably mounted on the drive wheel, the latch having a first latch arm extending perpendicularly of the latch for engaging the timer wheel and thereby latching the drive wheel to the timer wheel, and a second latch arm extending perpendicularly of the latch opposite to the first latch arm for engaging the check wheel and thereby latching the drive wheel to the check wheel, engagement of the first latch arm with the timer wheel and engagement of the second latch arm with the check wheel being mutually exclusive.

15. A timer assembly according to claim 14, wherein the latch is journalled through a boss affixed to the periphery of the drive wheel.

16. A timer assembly according to claim 12, wherein the releasing means comprises outwardly extending hook means affixed to the periphery of the timer wheel, the hook means engaging the first latch arm and latching said arm to the timer wheel when the timer is fully counterrotated.

* * * * *